(12) United States Patent
Bonetti (10) Patent No.: US 9,032,120 B2
(45) Date of Patent: May 12, 2015

(54) DEVICE AND METHOD FOR WRITING/READING A MEMORY REGISTER SHARED BY A PLURALITY OF PERIPHERALS

(71) Applicant: STMicroelectronics S.r.l., Agrate Brianza (IT)

(72) Inventor: Roberto Bonetti, Gorle (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 0 days.

(21) Appl. No.: 14/061,256

(22) Filed: Oct. 23, 2013

(65) Prior Publication Data

US 2014/0115200 A1 Apr. 24, 2014

(30) Foreign Application Priority Data

Oct. 24, 2012 (IT) .......................... MI2012A001800

(51) Int. Cl.
*G06F 13/42* (2006.01)
*G06F 13/16* (2006.01)
*G06F 13/368* (2006.01)
*G06F 13/40* (2006.01)

(52) U.S. Cl.
CPC ........ *G06F 13/1642* (2013.01); *G06F 13/4256* (2013.01); *G06F 13/368* (2013.01); *G06F 13/4022* (2013.01)

(58) Field of Classification Search
CPC ... G06F 13/4022; G06F 13/364; G06F 13/16; G06F 13/18; G06F 13/368; G06F 13/374; G06F 13/4256; H04L 12/40032
See application file for complete search history.

(56) References Cited

U.S. PATENT DOCUMENTS 4,320,457 A  *  3/1982 Tanikawa ...................... 710/114
4,620,118 A     10/1986 Barber
4,879,680 A     11/1989 Luckett et al.

2007/0038796 A1  2/2007 Subramanian et al.
2012/0246368 A1  9/2012 Kwon et al.

FOREIGN PATENT DOCUMENTS

CN      101414291 A    4/2009
EP       0505779 A2    9/1992
JP     2000242610 A    9/2000

OTHER PUBLICATIONS

Search Report and Written Opinion dated Jul. 10, 2013 from corresponding Italian Application No. MI2012A001800.

* cited by examiner

*Primary Examiner* — Driss N Alrobaye
*Assistant Examiner* — Ronald Modo
(74) *Attorney, Agent, or Firm* — Allen, Dyer, Doppelt, Milbrath & Gilchrist, P.A.

(57) ABSTRACT

A device and method for writing/reading a piece of data in/from a memory register shared by a plurality of peripherals, each peripheral having a peripheral clock signal, when two or more of the plurality of peripherals need to write/read such piece of data at the same time, the digital device including a central unit having the memory register and a bank of SL modules in signal communication with the central unit, the bank of SL modules being designed to write/read the piece of data. The bank of SL modules comprises a plurality of writing/reading modules whose priority value ranges between maximum and minimum priority values, each module being connected to a respective peripheral, the central unit includes a multiplexer in signal communication on the one hand with the plurality of writing/reading modules, and on the other hand with the memory register, each module comprises an arbitration cell, such that the first module is identified by the maximum priority value (Prmax') and the other N−1 modules are identified by decreasing priority values, the central unit operating at a predetermined main clock frequency to write/read the piece of data in the memory register.

12 Claims, 10 Drawing Sheets

DEVICE AND METHOD FOR WRITING/READING A MEMORY REGISTER SHARED BY A PLURALITY OF PERIPHERALS

CROSS REFERENCE TO RELATED APPLICATIONS

This application claims priority to Italian Patent Application No. MI2012A001800, filed Oct. 24, 2012, which is hereby incorporated by reference to the maximum extent allowable by law.

BACKGROUND

1. Technical Field

The present disclosure relates to a device and method for writing/reading a memory register shared by a plurality of peripherals.

Particularly, the present disclosure relates to a digital device that can manage writing/reading of a piece of data in a memory register shared by a plurality of peripherals, when two or more peripherals need to write/read such piece of data at the same time.

The field of the present disclosure is, for instance, the automotive field, where it may happen that two or more electronic control units in a motor vehicle need to simultaneously write/read (i.e. access to) a piece of data stored in a memory that is shared by the electronic control units.

2. Discussion of the Related Art

A digital system having a Ram memory bank, for instance with a dual/multi port for access to data stored therein is known in the prior art.

The operation of writing/reading data in/from the memory bank is ensured by a single clock signal, as disclosed, for instance in EP 505779. Nevertheless, while the system of EP 505779 allows, for example, two peripherals to access the memory bank according to stringent timing rules, it still cannot afford simultaneous access to the data stored in the Ram memory.

Furthermore, the system as disclosed in EP 505779 is not scalable, since addition or removal of a peripheral from management by a digital system requires the system to be redesigned anew.

In other words, it is difficult to adapt the system of EP 505779 to the changing needs of managing varying numbers of peripherals, once the digital system has been designed.

SUMMARY

One embodiment provides a device and method for writing/reading a memory register by a plurality N of peripherals that can meet the above requirements.

One embodiment provides a digital device for writing/reading a piece of data in a memory register shared by a plurality N of peripherals, each peripheral having a peripheral clock signal, when two or more of said plurality of peripherals need to write/read such piece of data at the same time, said digital device comprising a central unit having said memory register and a bank of modules in signal communication with said central unit, said bank of modules being designed to write/read said piece of data, wherein said bank of modules comprises a plurality of modules whose priority value ranges between maximum and minimum priority values, each of said modules being connected to a respective peripheral, said central unit comprises a multiplexer in signal communication on the one hand with said plurality of modules, and on the other hand with said memory register, each module of said plurality of modules comprising an arbitration cell which is designed such that the first module of said plurality of modules is identified by said maximum priority value and the other N−1 modules of said plurality of modules are identified by decreasing priority values, said central unit operating at a predetermined main clock frequency to write/read said piece of data in said memory register.

According to another embodiment, said central unit comprises a control logic and said arbitration cells are arranged in a modular chain of arbitration cells and are in signal communication with said control logic to ascertain, according to said priority value of each of said modules, which piece of data of each of said plurality of peripherals is to be written/read into/from said memory register.

According to another embodiment, said predetermined main clock frequency is equal to a frequency of a clock signal external to said digital device, said modules operating at said main clock frequency.

According to another embodiment, each module comprises at least a Write Input interface which is designed to allow each of said plurality of peripherals to provide its respective peripheral clock signal and its respective piece of data to each interface module; a Write Slave Register which is designed to store the piece of data of the corresponding peripheral, before loading of such piece of data into the memory register; an arbitration cell is configured in daisy chain arrangement, to ascertain when the piece of data available in the Write Slave Register has to be stored into the memory register; a Read Register, which is designed to display the contents of the memory register and a Read Output interface which is designed to allow signal communication with the corresponding peripheral, to read the contents of the memory register.

According to another embodiment, each module comprises a Write Request/Acknowledge Process cell which is designed to transfer the piece of data from the peripheral clock signal to the main clock signal; a Read Request/Acknowledge Process, which is designed to transfer the data in the memory register that operates at the peripheral clock signal, to the Read Register that operates at the main clock signal.

According to another embodiment, said multiplexer is designed to sequentially receive at its input the data of said Write Slave Register, according to both the arbitration cell and the timing of said control logic, the latter operating with said main clock signal.

According to another embodiment, said arbitration cell transfers the piece of data that comes from the corresponding peripheral to said memory register, said arbitration cell operating with said main clock, said data being transmitted to said Read Output interface according to an arbitration of handshake type.

According to another embodiment, there is provided a method of writing/reading a memory register shared by a plurality of peripherals each peripheral having a peripheral clock signal, said method comprising the steps of providing a central unit having a memory register and a bank of modules in signal communication with said central unit, said bank of modules being designed to write/read a piece of data for each of said plurality of peripherals in said memory register; providing a plurality of modules which are as many as the plurality N of said peripherals; sequentially numbering each module of the plurality of modules from one to N; assigning a maximum priority value to the first module of said plurality of modules; assigning decreasing priority values to each of the N−1 modules of said plurality of modules; connecting each module of said plurality of modules with a respective peripheral; and setting a main clock frequency for said central unit.

According to another embodiment, said step of assigning decreasing priority values requires the priority value to sequentially decrease as the numbers of the N−1 modules increase.

According to another embodiment, each peripheral has a priority value ranging between a maximum value and a minimum value, said step of connecting each module of said plurality of modules to a respective peripheral includes connecting said first maximum-priority module with the maximum-priority peripheral and the other N−1 modules with respective peripherals having decreasing priorities.

According to another embodiment, an arbitration cell compares the priority value of its respective interface module with the priority value of the previous cell and informs the next arbitration cell whether arbitration was won or not.

According to another embodiment, said main clock frequency is set to be equal to the clock frequency of said peripheral connected to said first module of said plurality of modules.

In one embodiment, a reading/writing device is provided, that can manage access to data stored in a memory register by various peripherals that operate according to their respective clock signals, when two or more peripherals need simultaneous access thereto.

Furthermore, in one embodiment, the reading/writing device is a modular device, allowing addition or removal of peripherals, with such addition or removal of peripherals not requiring the whole device to be redesigned. The peripherals being added are identical additional interface modules added to the reading/writing device, where the two types of interface modules are composed of predefined basic elements.

Figure 1:
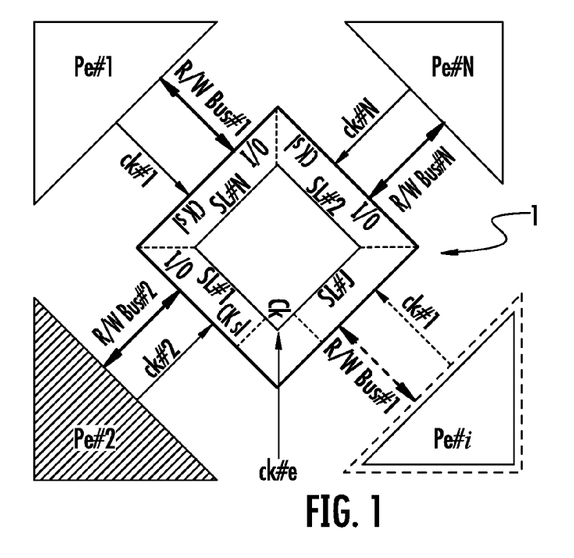
FIG. 1 shows a diagrammatic view of the principle of the embodiments.

Also, with the present device, access priorities of peripherals to the memory register are maintained even when peripherals are added/removed, by simply changing the priority level to each interface circuit, i.e. by changing the connection order of interface modules. This is because any change to be made to the priorities of the N peripherals would be simply made by interfacing such N peripherals to N data paths (see the modules SL#1, . . . , SL#N as shown in FIG. 1) of the central unit in a different order, according to the rule that the lower the number of data paths, the higher the priority of the peripheral.

The modularity of the device allows the RTL code to remain unchanged, even when the writing priorities of the peripherals N change according to the functions of the peripherals in the "System On Chip" (shortly SOC).

Furthermore, in one embodiment, the device for assembling each module can manage data writing/reading into/from the memory register even when the peripherals have different hardware priorities for writing/reading data into/from the memory register.

Also, in one aspect, the process that allows the request for writing/reading operations has neither timing restrictions nor software restrictions.

Finally, the writing/reading device may be formed by discrete components an implemented with a plug & play design.

BRIEF DESCRIPTION OF THE DRAWINGS

The characteristics and advantages of the present disclosure will appear from the following detailed description of a possible practical embodiment, illustrated as a non-limiting example in the set of drawings, in which.

DETAILED DESCRIPTION

Although this is not expressly shown, the individual features described with reference to each embodiment shall be intended as auxiliary and/or interchangeable with other features, as described with reference to other embodiments.

The present disclosure relates to a digital writing/reading device 1, which may be implemented in discrete form or integrated in a so-called "System On Chip" (SOC), having N peripherals Pe#1, . . . , Pe#N, each generally operating with its own clock signal ck#1, . . . , ck#N, which is asynchronous to an external clock signal ck#e and to the other N−1 peripheral clock signals.

Particularly, multiple peripherals may have the same clock signal, which may in turn be different from or equal to the external clock ck#e.

Figure 2A:
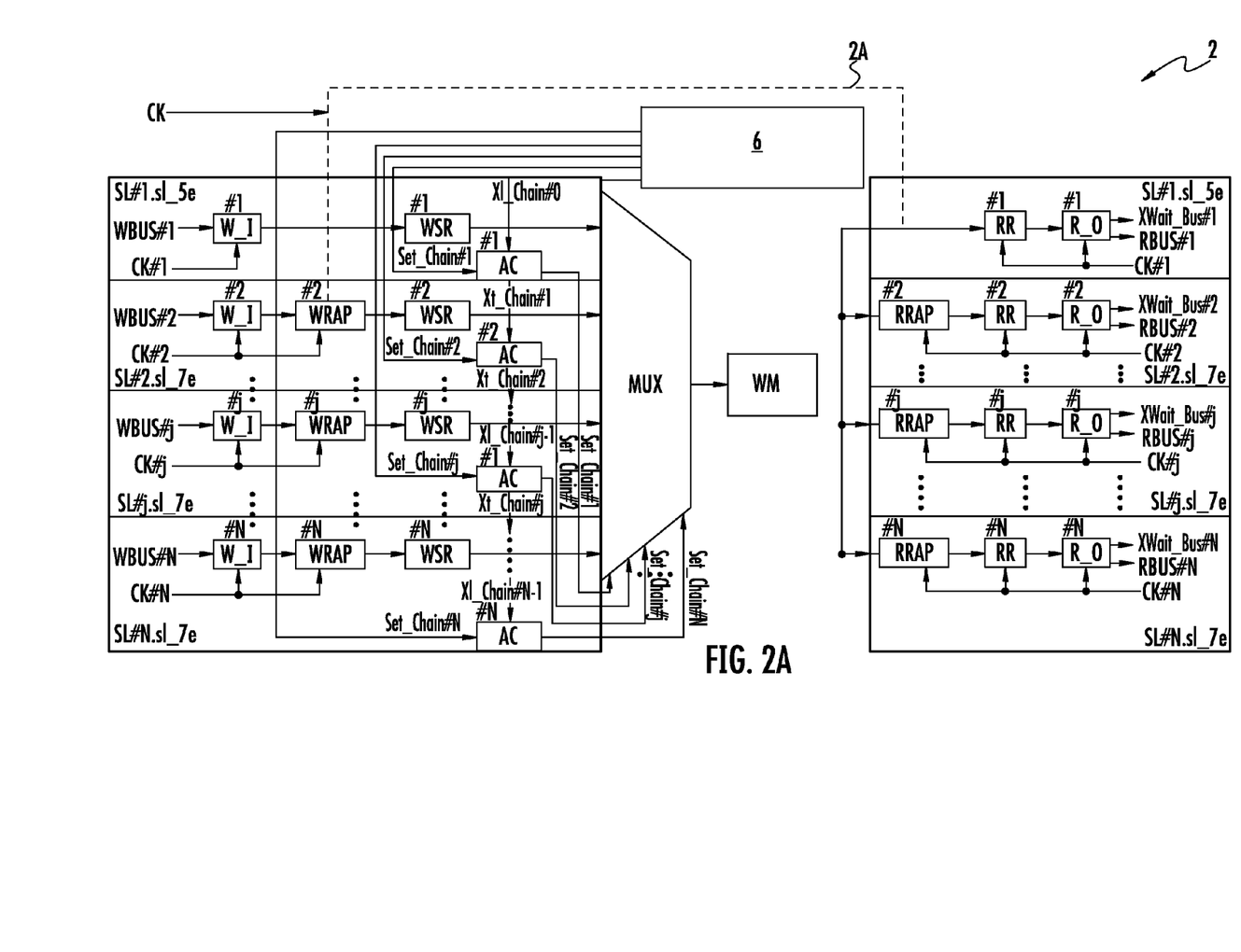
FIG. 2A shows a block diagram according to one embodiment, which is configured for the case in which one peripheral has a clock equal to a clock ck#e external to the device for writing/reading a memory register shared by a plurality of peripherals.
Figure 2B:
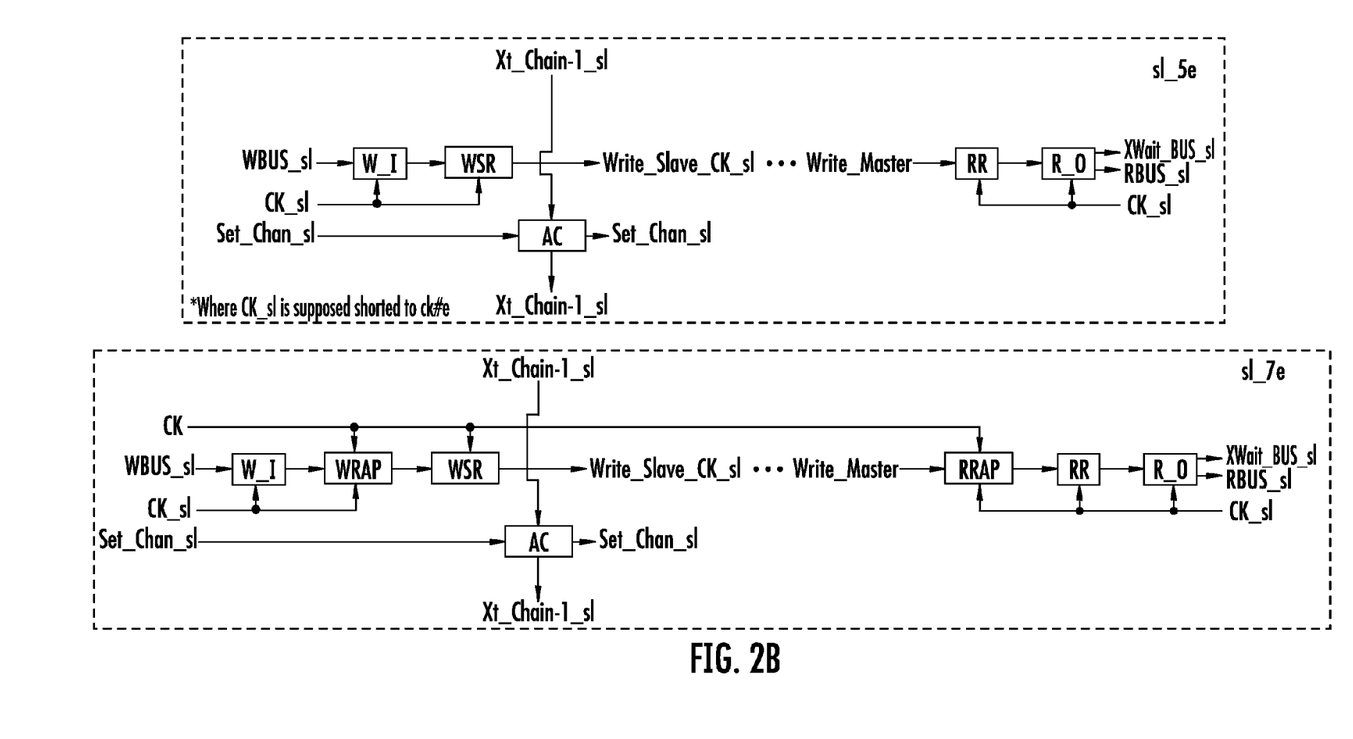
FIG. 2B shows a block diagram of the two types of module circuits according to one embodiment, in which the first type comprises seven basic elements because the clock of the peripheral is different from the external clock and the second type comprises five basic elements because the clock of the peripheral is equal to the external clock ck#e.

It shall be noted that the example of FIGS. 1 and 2A will be explained hereinbelow, in which the clock signal ck#1 is assumed to be equal to the external clock signal ck#e, to describe the operation of two types of modules, as shown in FIG. 2B and designated by references sl_7e e sl_5e, where:

sl_7e represents the module having seven basic elements, with the peripheral clock being different from the external clock;

sl_5e show the module having five basic elements, with the associated peripheral clock being equal to the external clock ck#e, and the two clock translators of the first module type being omitted.

Each of the N peripherals Pe#1, . . . , Pe#N has its own peripheral priority value Pr, ranging between a maximum value Prmax=N and a minimum value Prmin=1.

Such N peripherals shall be able to write/read (i.e. share) a piece of data into/from a memory register WM.

Particularly, the writing/reading device 1 is designed to manage the possibility that two or more peripherals would access the piece of data in such memory register WM at the same time.

For instance, the number N of the peripherals Pe may be an arbitrary integer such as two, three, four and so on.

Referring to the accompanying figures, the writing/reading device 1 comprises a central unit 2 having the memory register WM, and a bank of SL modules via I/O interface blocks in communication with the central unit.

Particularly, the bank of SL modules is in signal communication with the central unit 2 via respective I/O interface blocks, and is designed to write/read a piece of data d#i concerning each of the plurality N of peripherals Pe#1, . . . , Pe#N into/from the memory register WM.

In one aspect, in order to allow access to the memory register WM to write/read the piece of data d#i by two or more peripherals Pe#1, . . . , Pe#N at the same time, the bank of modules SL comprises a plurality of modules SL#1, . . . , SL#N that are as many as the plurality N of the peripherals Pe#1, . . . , Pe#N.

Particularly, each of these modules SL#1, . . . , SL#N is in signal communication with a corresponding peripheral Pe#1, . . . , Pe#N via its respective I/O write/read interface block.

Therefore, each module SL#1, . . . , SL#N is designed to receive/write/read the piece of data d#i generated by the peripheral with which it is connected.

Each module SL#1, . . . , SL#N has a priority value ranging between a maximum priority value Prmax' and a minimum priority value Prmin'.

It shall be noted, also referring to FIG. 2A that the central unit 2 comprises a multiplexer MUX, which is in signal communication on the one hand with the plurality of modules SL#1, . . . , SL#N and on the other with the memory register WM.

Particularly, the plurality of modules are connected both to the multiplexer MUX as drivers and from the memory register WM as receivers.

In one embodiment, access to the piece of data d#i in the memory register WM by the N peripherals is managed by hardware through the plurality of modules SL#1, . . . , SL#N.

Particularly, each module SL#1, . . . , SL#N is in signal communication with the central unit 2 via a respective write/read bus W/R Bus#1, . . . , W/R Bus#N, con i ranging from 1, . . . , to N.

Therefore, as the number N of peripherals to be managed by the device 1 increases, a corresponding number of modules SL#1, . . . , SL#N shall be provided.

Particularly, each module of the plurality of modules SL#1, . . . , SL#N comprises an arbitration cell AC, such that the first module SL#1 of said plurality of modules SL#1, . . . , SL#N is identified by the maximum priority value Prmax' and the other N−1 modules SL#2, . . . , SL#N are identified by decreasing priority values.

In other words, the first module SL#1 is assigned the maximum priority value Prmax', the second module SL#2 is assigned a priority value lower than the priority value Prmax' of the first module SL#1, the third module SL#3 is assigned a priority value lower than the priority value Prmax' of the first module SL#1 and the priority value of the second module SL#2, the $N^{th}$ module is assigned a minimum priority value Prmin', which is lower than the priority value of the N−1$^{th}$ module SL#N−1.

The arbitration cell AC in each module, either of sl_7e or sl_5e type, can enable or disable access thereof to the MUX according to the received input; therefore, each module of the plurality of modules SL#1, . . . , SL#N has a self-arbitration ability.

Advantageously, in one embodiment, the peripheral Pe#h (where h falls within the range of 0<h<N−1), having the maximum priority value Prmax is the one designed to be connected to the first module SL#1, i.e. the module having the maximum priority Prmax'.

The other peripherals Pe are connected to the N−1 interface modules, according to their priority value.

In other words, the interface module SL#2 (the index "2" being other from the index "h") is connected with the peripheral Pe with the highest priority among the remaining peripherals, as the peripheral Pe#h having the maximum priority value has already been connected to the module SL#1.

In one aspect, the central unit 2 operates at a main clock frequency CK that is predetermined and can be freely set to write/read the piece of data d#i into/from the memory register WM, as being connected external to the clock ck#e.

Particularly, depending on how the external clock ck#e is selected, the main clock signal CK of the central unit 2 may have the same frequency as the peripheral clock signal ck#1, . . . , ck#N of the peripheral Pc connected to the module SL#1, i.e. the interface module operating with the maximum priority value Prmax. Therefore, the main clock signal CK of the central unit 2 is equal to the clock signal of the peripheral Pe connected with the module SL#1, . . . , SL#N that has been assigned the maximum priority value Prmax.

Otherwise, the central unit 2 may operate with a clock signal CK having the same frequency as a clock signal ck#e external to the device, and different from that of all the clocks ck#1, . . . , ck#N of the peripherals Pe. For example, this external clock signal ck#e may have a frequency above the frequency of the clock signals ck#1, . . . , ck#N of the peripherals Pe.

Thus, the main clock signal CK with which the central unit 2 operates, may be set to be equal to the frequency of, i.e. connected to, any of the N+1 available clocks, i.e. the N peripheral clocks ck#1, . . . , ck#N and the external clock ck#e.

Figure 8:
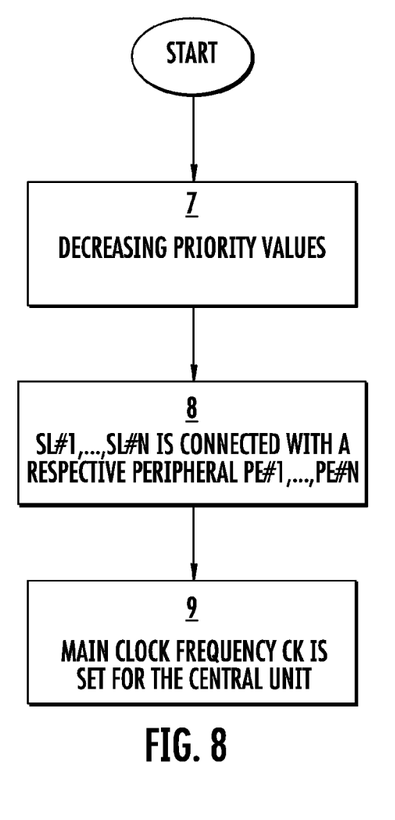
FIG. 8 shows a flowchart of the method of operating the device for writing/reading a memory register shared by a plurality of peripherals.

Referring now to FIG. 8, in one aspect of the method, a maximum priority value is assigned to the first module of the plurality of modules SL#1, . . . , SL#N, and decreasing priority values are assigned to each of the N−1 modules of the plurality of modules SL#1, . . . , SL#N (block 7).

Also, each module of the plurality of modules SL#1, . . . , SL#N is connected with a respective peripheral Pe#1, . . . , Pe#N (block 8) and a main clock frequency CK is set for the central unit 2. Preferably, this clock frequency is set to be equal to the clock frequency of the peripheral connected to the first module SL#1 of the plurality of modules SL#1, . . . , SLN (block 9).

Particularly, in one aspect of the method, the priority value is designed to sequentially decrease as the number of the N−1 modules SL#2, . . . , SL#N increases.

Advantageously, since each peripheral Pe#1, . . . , Pe#N has a priority value ranging between a maximum value and a minimum value, the step of connecting each module of the plurality of modules SL#1, . . . , SL#N to a respective peripheral Pe#1, . . . , Pe#N includes connecting the first maximum-priority module with the maximum-priority peripheral and the other N−1 modules with respective peripherals having decreasing priorities.

Since the module SL#1 has the highest priority Pr in writing the memory register WM, i.e. Prmax=N, and FIG. 1 shows that the peripheral Pe#2 is connected to the module SL#1 via the I/O write/read block, then the peripheral Pe#2 will have the maximum access priority among the peripherals Pe in the module.

In addition to allowing access of peripherals to the single memory register WM, according to their priorities, the situation may be handled in which an additional peripheral Pe is added, whose value, e.g. priority value, exceeds the priority values of the peripherals Pe managed to that moment.

Particularly, the central unit 2 comprises a control logic 6 and the arbitration cells AC are arranged in a daisy chain, i.e. as a modular chain of arbitration cells.

Such arbitration cells AC are in signal communication with the control logic 6 to ascertain, according to priority value Pr' of the modules SL#1, . . . , SL#N, which piece of data d#i of each of the plurality N of peripherals Pe#1, ..., Pe#N has to be written into the memory register WM.

Referring now to FIGS. 2A and 2B, it shall be noted that the plurality of modules SL#1, ..., SL#N is composed of identical interface circuits.

It should be also noted that each module is formed using the same circuit components; that is, the N peripherals Pe#1, ..., Pe#i are interfaced with their respective modules SL#1, ..., SL#N, which have identical circuit forms.

Each module SL#1, ..., SL#N is of sl_7e type if its clock externally connected to the pin CK#J is different from the clock externally connected to the pin CK, i.e. ck#e≠ck#i, and comprises seven circuit elements (as shown in FIG. 2B); and each of such N modules is of sl_5e type if its clock externally connected to the pin CK#J is equal to the clock externally connected to the pin CK, i.e. ck#e=ck#i, and comprises five circuit elements (as shown in FIG. 2B).

Referring now to FIG. 2A, with the module SL#1 selected as sl_5e type, i.e. composed of five basic elements only (see FIG. 2B), the external clock signal ck#e is equal to the clock signal ck#2, i.e. that of the peripheral Pe#2.

The module SL#2, which is connected to the peripheral Pe#N in FIG. 1, has a lower priority than the module SL#1, but a higher priority than the other modules, and operates at the frequency of the clock signal ck#N of the peripheral Pe#N by connection to the pin CK#2 of the module SL#2.

With the clock ck#N having a frequency other than ck#e, the module SL#2 has been appropriately selected as sl_7e type, i.e. composed of seven "basic elements" (as shown in FIG. 2B).

In view of the above and with reference to FIGS. 2A and 2B, each module SL#1, ..., SL#N comprises the basic elements that form the sl_7e module and/or the sl_5e module.

Particularly, the module sl_5e comprises at least:
a Write Input interface W_I, which is designed to allow each of said plurality N of peripherals to provide its respective peripheral clock signal ck#1, ..., ck#N and its respective piece of data d#i to each interface module and
a Write Slave Register WSR, which is designed to store the piece of data d#i of the corresponding peripheral, before loading of such piece of data d#i into the memory register WM;
an arbitration cell AC is configured in daisy chain arrangement, to ascertain when the piece of data d#i available in the Write Slave Register WSR has to be stored into the memory register WM;
a Read Register RR, which is designed to display the contents of the memory register WM and
a Read Output interface R_O, which is designed to allow signal communication with the corresponding peripheral Pe, to read the contents of the memory register WM.

Particularly, in addition to what is provided in the module sl_5e, the module sl_7e comprises at least:
a Write Request/Acknowledge Process cell WRAP, which is designed to transfer the piece of data d#i from the peripheral clock signal ck#i to the main clock signal CK;
a Read Request/Acknowledge Process RRAP, which is designed to transfer the data in the memory register WM that operates at the peripheral clock signal ek#1, ..., ck#N, to the Read. Register RR that operates at the main clock signal CK.

The central unit 2 comprises a control logic 6, such that the multiplexer MUX sequentially receives the data d#i at its input from the Write Slave Register WSR, according to both the arbitration cell AC and the timing of the control logic 6, the latter operating with the main clock signal CK and outputs the piece of data d#i that is to be written into the memory register WM.

It shall be noted that the main clock signal CK is propagated within the entire perimeter of the block 2A i.e. between the Write Request/Acknowledge Process cell WRAP and the Read Request/Acknowledge Process RRAP of each module SL#j, whereas the peripheral clock frequency is used outside such perimeter (i.e. outside the block 2A of FIG. 2A).

Referring to the particular embodiment of FIG. 2A, the main clock on CK is equal to the clock of the peripheral Pe#2 connected to the sl_5e module SL#1, and hence the clock on CK is equal to the clock on CK#1.

Namely, the data d#i operating with the clock of the peripheral Pe#1 will not need to be translated to the memory register WM, whereby the sl_5e module SL#1 will have no Write Request/Acknowledge Process cell WRAP and no Read Request/Acknowledge Process call RRAP. However, these two basic blocks are present in the remaining modules SL#j (j=2 ... N) all of sl_7e type (FIGS. 2A and 2B).

If multiple peripherals have to simultaneously write their data d#i into the memory register WM, and since the first plurality of write interface circuits are assigned a priority value ranging between maximum and minimum values, e.g. with the maximum value being assigned to the module SL#1, and the other modules SL#2, ..., SL#j ..., SL#N being assigned progressively decreasing values, the highest priority value is assigned to the peripheral Pe#i connected to the module SL#j having the lowest j value, i.e. the module SL#j that has the highest priority value, excluding the module SL#1, whereby the next is j=2.

If the main clock CK is required to be faster than those of the individual peripherals Pe1, ..., Pe#i, ..., Pe#N, then the main clock CK may be connected, for instance, to a dedicated external clock ek#e that is faster than the peripheral clocks ck#1, ..., ck#N, with the priority of the peripheral Pe#i interfaced with SL#1 being maintained at the highest value.

For this purpose, still referring to FIG. 2A, the peripheral Pe#i is found to load its piece of data d#i into the module SL#j via the bus W Bus#j. At the same time, the peripheral Pe#i transfers the piece of data d#i when the signal XWait_Bus#j rises to a high value, as shown in the block diagram of the embodiment of the Write Input interface W_I of FIG. 4A.

The piece of data D#j (circulating through the slot SL#j), i.e. the piece of data d#i transmitted by the peripheral Pe#i and circulating through the module SL#j, is maintained in the Write Input interface W_I until writing of all registers R_O is acknowledged through the cell WRAP of the respective module SL#j. Then, the peripheral Pe#i transfers the piece of data d#i when the signal RBUS#j goes low.

In one aspect, the module SL#j operates with a peripheral clock signal ck#i connected to the pin CK#j, whereas the register WM operates with the main clock signal CK. Through a Request/Acknowledgement process, the circuit WRAP of the corresponding module SL#j loads the piece of data D#j timed with the peripheral clock signal c#i connected to the pin CK#j, into the memory register WM that operates with the main clock signal.

It shall be noted that the register WSR of the module SL#1 in the example of FIG. 2A does not need the WRAP and RRAP cells, as the main clock signal CK has been assumed to be forced external to the module by the peripheral clock signal (ck#2 in the example of FIG. 1) connected to the module SL#1 via the pin CK#1 of FIG. 2B (ck#e=ck#2).

If the main clock signal CK is connected to an external clock signal ck#e other than any other peripheral clock, then all the modules SL#j will implement the WRAP and RRAP cells, as they will have to move the piece of data D#j from a CK#j-timed circuit (=ck#i) to a CK-timed circuit (=ek#e) and vice versa.

When the memory register WM is updated with the data of the peripheral Pe#i, then any RRAP#j cell loads the piece of data D#j into its own register RR#j.

Through a Request/Acknowledgement process, the RRAP#j cell allows both the contents of the memory register WM to be read at the frequency of the main clock signal CK and the data D#j to be written into a register that operates at the peripheral clock signal ck#i.

Finally, the content D#j of the memory register WM is written into all the cells R_O, so that all the peripherals Pe#i may read them.

It shall be noted that, as described below, during reading by any one of the peripherals Pet, the signal XR#j rises to a high value.

Possible embodiments of the components of the modules SL#1, . . . , SL#N of the device 1 and their operating wave forms are now described, where the signals not expressly described shall be intended to come from the control logic 6.

Figure 3A:
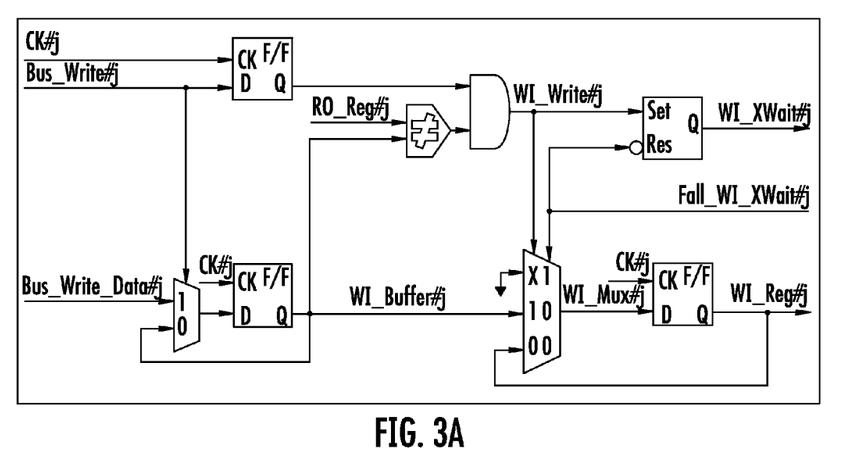
FIGS. 3A/3B to 7A/7B show block diagrams of other embodiments of various elements of the device and a timing diagram for the operation of such elements respectively.
Figure 3B:
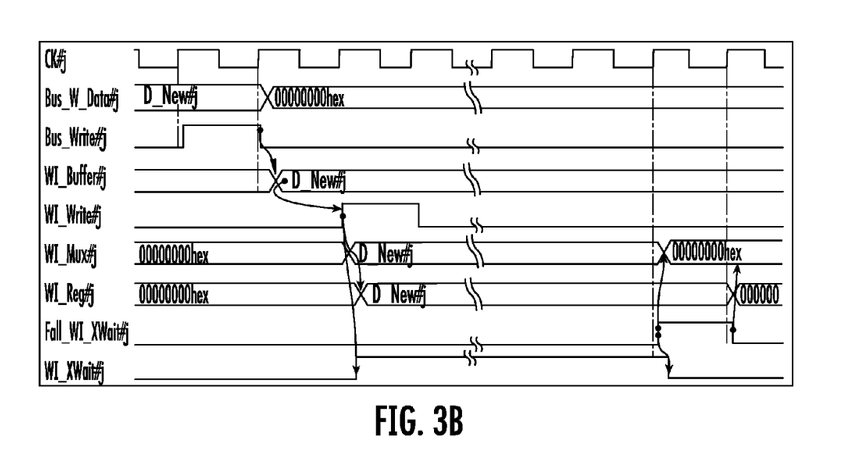

Referring now to FIGS. 3A and 3B, which show a possible embodiment of the cell W_I of one of the modules SL#j and its operation timings respectively, it may be noted that such cell W_I#j transfers the piece of data D#j written by the corresponding peripheral Pe#i into the memory register WM according to its bus.

In one aspect, both the peripheral Pe#i and the cell W_I of the circuit of the module SL#j operate at the same clock signal ck#i=CK#j.

The register WI_Buffer#j receives a set of valid data D#j, through the peripheral bus WBUS#j, when the peripheral Pe#i disables the write control signal Bus_Write#j, thereby ensuring a stable value on the bus Bus_Write_Data#j.

If during writing the register WI_Buffer#j is different from the contents of the memory register WM, displayed through the Read Output register RO_Reg#j of the cell R_O of the module SL#j, then:

1) the contents of the buffer WI_Buffer#j will be transferred to the output of the cell W_I of the module SL#j, i.e. to the Write Input register W_I Reg#j;

2) the cell WRAP of the module SL#j receives the start pulse from WI_Write to initiate transfer of WI_Reg#j data into the memory register WM through a Request/Acknowledgement process;

3) as the signal W_I XWait signal rises, any read/write access of the peripheral Pe#i to the module SL#j is blocked.

Once the data W_I REG#j have been written into the memory register WM and into the Slave Read registers (see Read_Slave_CK#j in FIG. 6A), the signal Fall_WI_XWait#j acknowledges and the peripheral Pe#i can access the module SL#j.

Figure 4A:
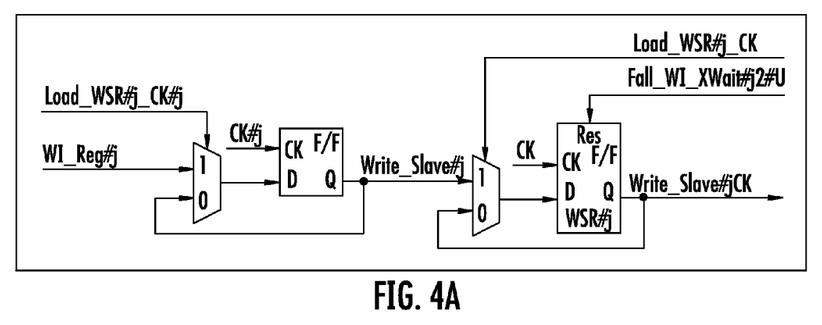
Figure 4B:
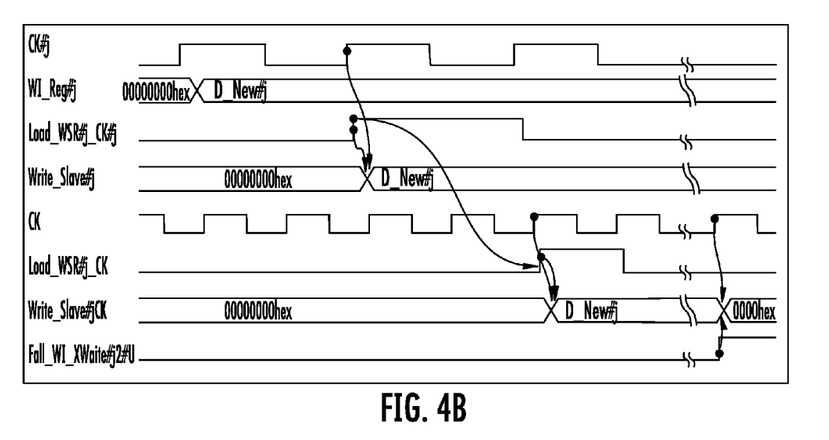

Referring now to FIGS. 4A and 4B, which show one embodiment of the cell WRAP of one of the modules SL#j and its operation timings respectively, it may be noted that such cell WRAP of the module SL#j transfers the data d#i of the peripheral Pe#i in the register W_I Reg#g operating with the clock ck#j into the register WSR of the module SL#j, timed by the main clock signal CK. The clock domain is changed through request/acknowledgement of the handshake protocol that allows the piece of data D#j to be transferred from an asynchronous clock domain CK#j to another asynchronous clock domain CK.

Once the register W_I Reg#j receives a new piece of data D#j, the signal W_I XWait rises to a high value, a pulse is generated on the signal Load_WSRj_CK#j (see FIGS. 4A and 4B) and the register Write_Slave#j is updated with the new data D#j.

The register Write_Slave#j, operating under the domain of the signal CK#j, maintains the new data D#j stable, until the request process copies it into the register Write_Slave#JCK under the domain of the main clock CK.

The signal produces the transfer pulse during a secure main clock cycle CK, where both the register Write_Slave#j and the register Write_Slave#JCK are not guided by any other pulse. Then, until the memory register WM is written with the value of the register Write_Slave#JCK, the register Write_Slave#JCK maintains the piece of data D#j stable.

Once the register Read_SlaveCK#j (see FIG. 6A) is updated with the contents of the memory register WM, the signal Fall_WI_XWait#j will be valid for a main clock cycle CK by cleaning up the register Write_Slave#j CK.

Figure 5A:
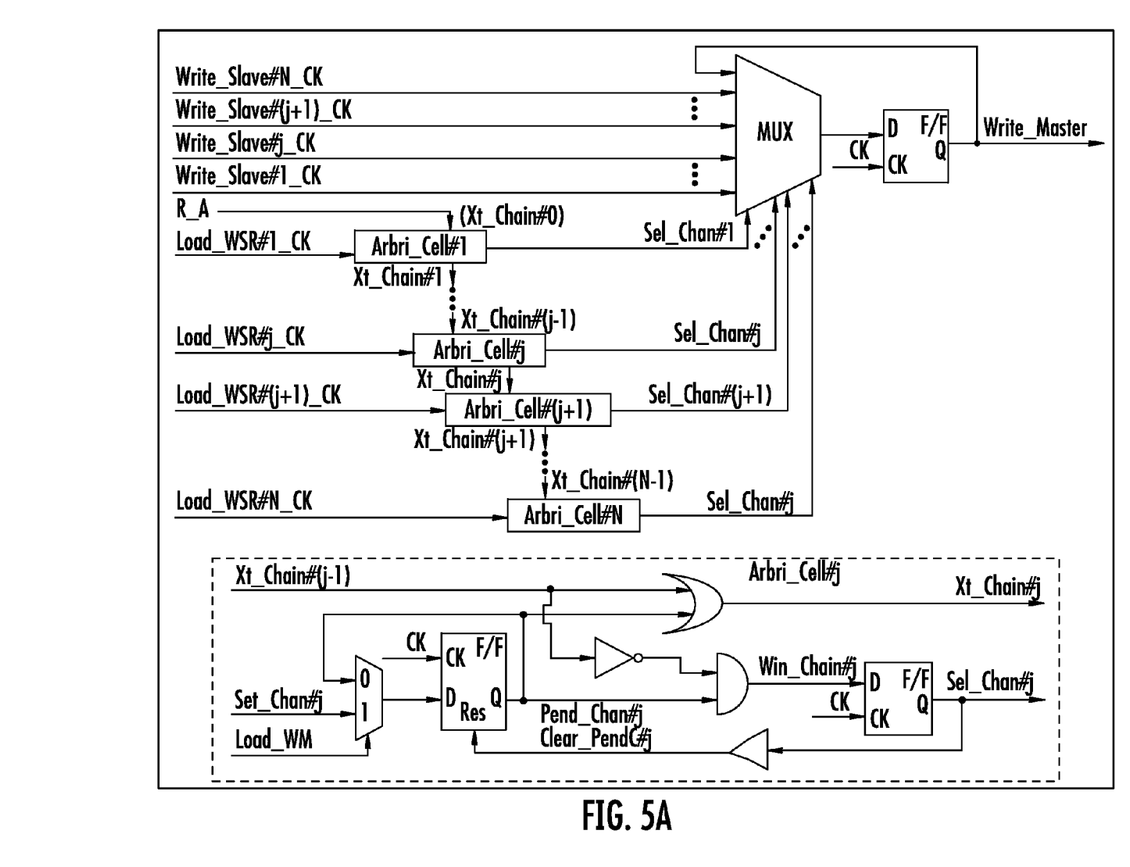
Figure 5B:
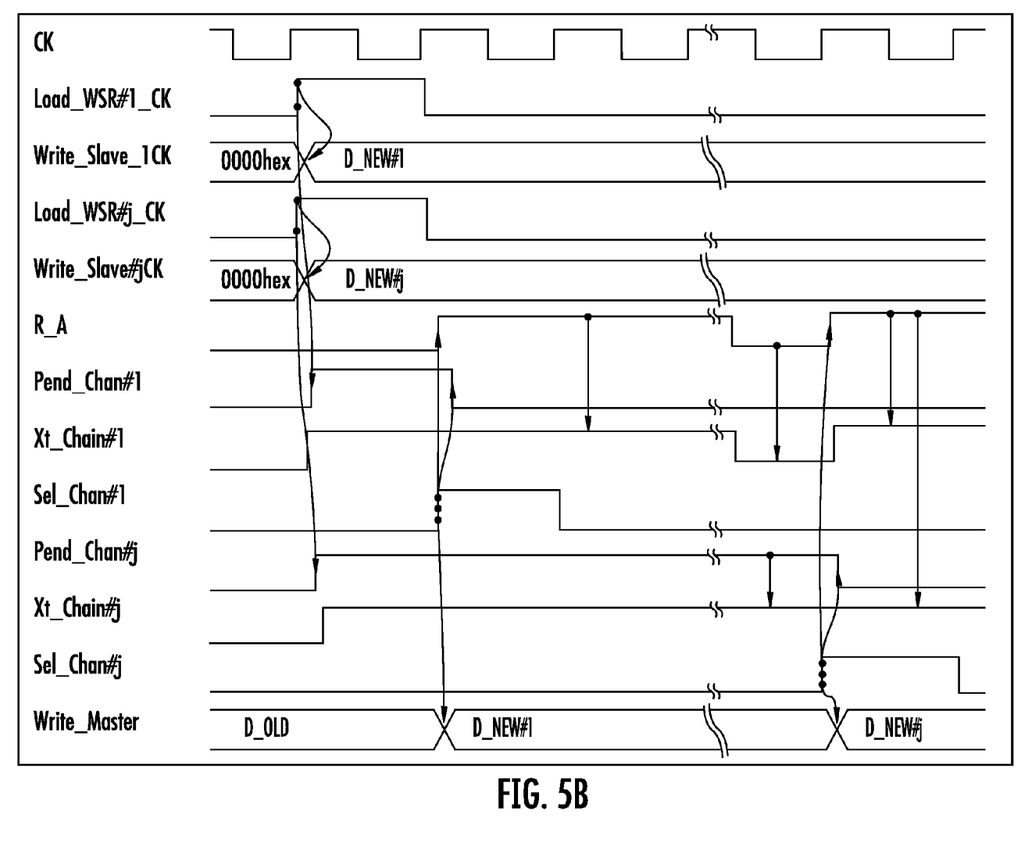

Referring now to FIGS. 5A and 5B, which show one embodiment of the arbitration cell AC of one of the modules SL#j and its operation timings respectively, it may be noted that such arbitration cell AC transfers the piece of data D#j that comes from the peripheral Pe#i into the memory register WM.

The domain of the clock signal is the domain of the main clock CK.

If multiple registers Write_Slave request to write the memory register WM during the same clock cycle, then the peripheral Pe with the lowest value will write the memory register WM first.

The piece of data will be transmitted to all the registers R_O by means of a process request/acknowledgement of handshake type while the arbitration process is stopped.

The maximum priority selection is processed by a modular chain of arbitration cells AC.

Particularly, in one aspect, the arbitration cell of the module SL#j AC compares its priority value with the previous cell SL#(j−1) AC and informs the next cell SL#(j+1) AC whether arbitration was won or not.

It shall be noted that, considering that the Slave Write register registers arbitration when a single piece of data D#j is ready to be written into the memory register WM (see FIG. 5A for the schematic view and FIG. 5B for the waveform, where the winner is assumed to be #j=1), when the pulse Load_WSR #jCK is valid, the new piece of data D#j is written on the bus Write_Slave#JCK and the arbitration cell AC Arbri_Cell#j of the module SL#j has the signal Set_Chan#j at its input.

The channel #j wins the arbitration and the output Xt_Chain#j of the arbitration cell AC of the module SL#j is disabled.

This also means that no other arbitration cell AC can win along the arbitration chain, because these arbitration cells are forced to a low value by the signal Win_Chain#j.

In the next cycle, the piece of data D#j is stored in the memory register WM and the pending bit Pend_Chan#j is deleted; all the requests start to update the registers R_O, where the signal R_A rises to a high level, thereby disabling the whole arbitration chain.

When the cells R_O are updated with the contents of the memory register WM, the signal R_A drops to a low value, as the request procedures have been terminated.

If two or more pieces of data are ready to be written during the same main clock cycle CK, in the memory register WM, also referring to FIG. 5B, the signal Load_WSR#1_CK may be considered as the high priority channel and the signal Load_WSR#j_CK may be considered as the lower priority channel. Both may set the pending bit, but the arbitration chain is disabled for the channel #j until all the cells R_O are updated with the contents of the memory register WM.

Once the signal R_A falls to a low value, the arbitration will be won by the upstream-most channel with the pending bit still set.

Then, the behavior will be as described above for the case in which one piece of data only is ready to be written into the memory register WM during a main clock cycle CK.

Figure 6A:
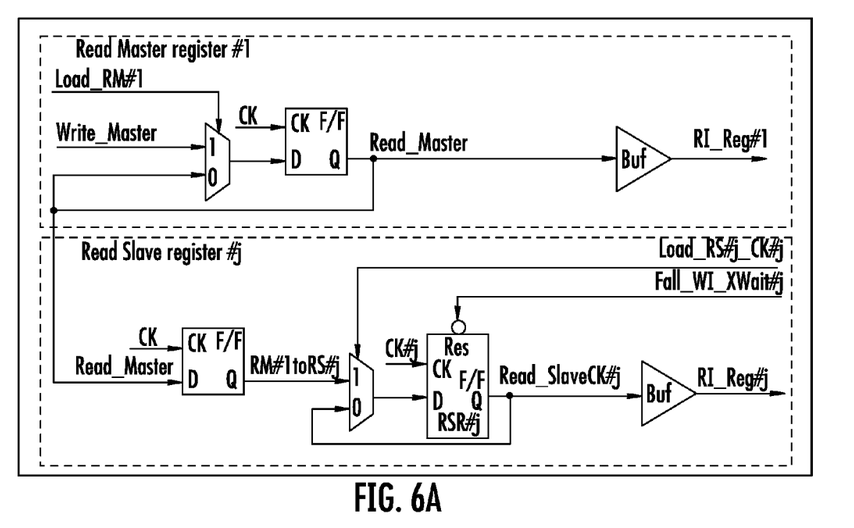
Figure 6B:
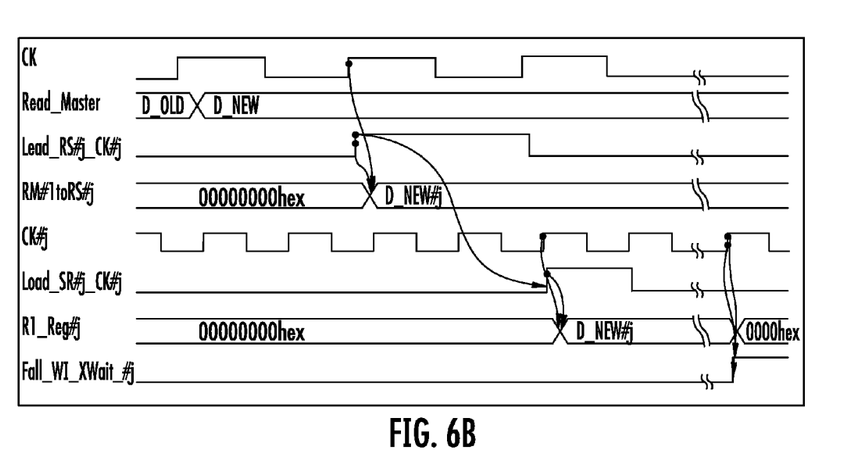

Referring now to FIGS. 6A and 6B, which show a possible embodiment of the cell RRAP of one of the modules SL#j both for j=1 and for j>1 and its operation timings respectively, it may be noted that the cell RRAP transfers the data in the memory register WM, operating at the frequency of the main clock signal CK, to the register Read_SlaveCK#j, operating at the peripheral clock signal ck#i.

The data between two different asynchronous clock domains is transferred through request/acknowledgement of the handshake protocol.

Particularly, for j=1, the register Read_Master is updated with a main clock cycle CK once the memory register WM has been updated (see the upper part of FIG. 6A), as CK#j=CK.

The peripheral Pe#2, connected to the module SL#1 according to the example as shown in FIG. 1, can read once the data is loaded into the interface cell R_O via the bus RI_Reg#1bus.

Particularly, if the interface modules have a clock signal equal to the main clock CK, i.e. if j>1, then all the other registers SL#j.Read_SlaveCK#J (see the lower part of FIG. 6A) are updated by validation of the pulse Load_RS#j_CK#j by a request/acknowledgement process, where the contents of the register Read_Master (operating at the frequency of the clock signal CK) is securely copied into the register Read_SlaveCK#j (operating at the frequency of the clock signal ck#i).

The peripheral Pe#j connected to the interface module SL#j will be able to read data, when data are loaded into the cell R_O via the bus RI_Reg#j bus.

Once all the cells RRAP of the modules SL#1, . . . , SL#j have updated their registers Read_SlaveCK#1, . . . , N, then all the Write Waits signals are disabled, which means that all the signals SL#1.WI_Xwait#j, . . . , SL#N.WI_Xwait#j drop to a low value through control of the control logic 6.

This allows writing of the memory register WM.

Figure 7A:
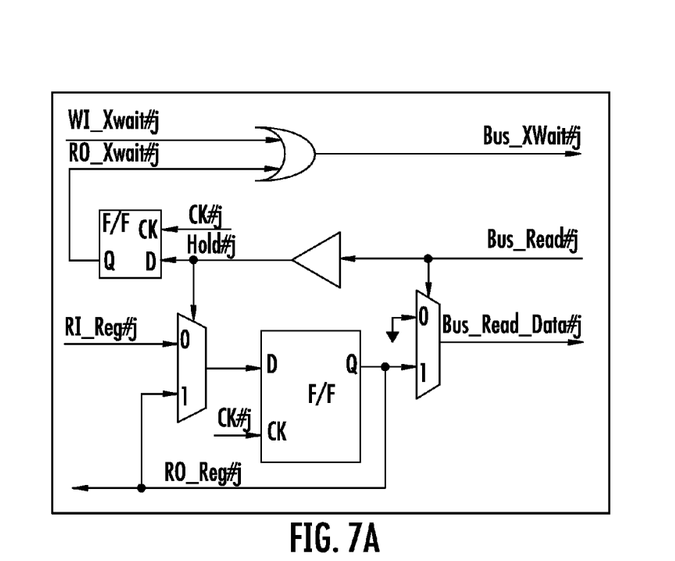
Figure 7B:
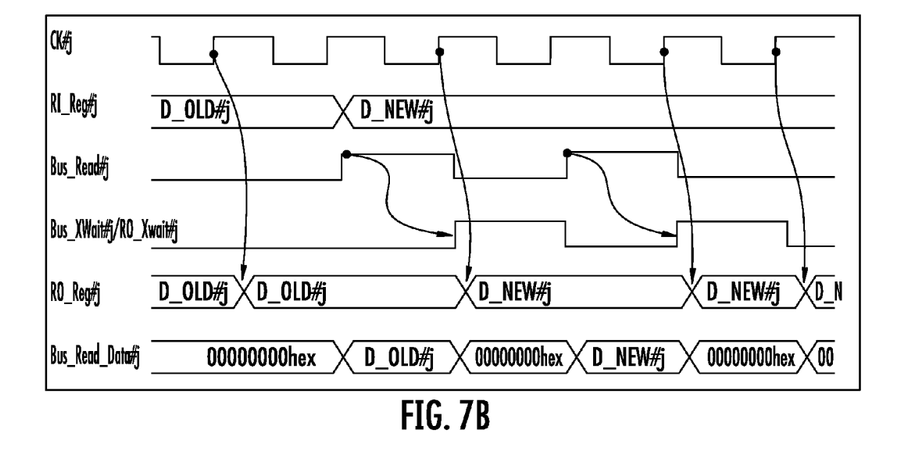

Referring now to FIGS. 7A and 7B, which show a possible embodiment of the cell R_O of one of the modules SL#j and its operation timings respectively, it may be noted that such cell R_O can copy the contents of the memory register WM into the register R_O Reg#j, wherefrom the peripheral Pe#i may read via the output bus Bus_Read_Data#j, when the control signal Bus_Read#j is valid.

The data in the memory register WM is not directly readable by the peripheral Pe#i via the bus RI_Reg#j, because in this case it might change the state of the peripheral Pe#i, with an unpredictable value being set in such bus.

For this reason, at each peripheral clock cycle ck#i, the output of the register RO_Reg#j is updated, as shown in the waveforms of FIG. 7B.

In order to read the memory register WM via the bus the peripheral Pe#i shall validate the control signal Bus_Read#j that will force a refresh of the register RO_Reg#j, once it is activated.

This will ensure secure reading of the memory register WM by the peripheral Pe#i.

Since a time equal to the peripheral clock cycle ck#i is required to update the register R_O Reg#j, the control signals RO_XWait#j are raised to a high value for a peripheral clock cycle ck#i on any peripheral Pe#i.

Particularly, FIG. 7B shows the waveforms for two successive reading requests by the peripherals Pe#i.

It shall be noted that both the signals R_O XWait#j and the signals WI_XWait#j are in OR relationship to the signal Bus_XWait#j that belongs to the interface bus of the peripheral Pe# i.

It shall be noted that, in one aspect, to ensure proper writing/reading at each peripheral Pe#i, any inappropriate access is handled by the Transfer Wait signal when the latter is at a high value, to stop any new writing of the memory register WM until the current writing operation is completed.

Those skilled in the art will obviously appreciate that a number of changes and variants may be made as described hereinbefore to meet specific needs, without departure from the scope of the invention, as defined in the following claims.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A system comprising:
   a plurality of peripherals, each peripheral having a respective peripheral clock signal; and
   a controller comprising
      a memory register configured to be shared by said plurality of peripherals,
      a logic unit coupled to said memory register and configured to operate based upon a clock signal to write/read data in said memory register,
      a bank of modules coupled to said logic unit and respectively coupled to said plurality of peripherals, said bank of modules configured to
         write/read the data in said memory register, and
         have priority value ranges between first and second priority values, the second priority value being greater than the first priority value, and
      a multiplexer between said bank of modules, and said memory register;
   each module of said bank of modules comprising an arbitration cell configured to
      set a first module of said bank of modules to said first priority value, and
      set the other modules of said bank of modules to lesser priority values;
   said logic unit configured to write/read the data in said memory register when two or more of said plurality of peripherals need to write/read the data to/from said memory register at the same time using the set priority values of said bank of modules;
   said arbitration cells from said bank of modules being coupled in a modular chain of arbitration cells.

2. The system as in claim 1 wherein the clock signal operates at a frequency equal to a frequency of a clock signal external to said controller; and wherein said bank of modules is configured to operate based upon the clock signal.

3. The system as in claim 2 wherein each module comprises:
   a write input interface configured to receive, from each of said plurality of peripherals, the respective peripheral clock signal and a respective piece of data;
   a write slave register configured to store the respective piece of data before storing the respective piece of data in the memory register;

a read register configured to display contents of the memory register; and a read output interface configured to read the contents of the memory register; and wherein said arbitration cell is configured in daisy chain arrangement, and to determine when the respective piece of data in said write slave register has to be stored in the memory register.

4. The system as in claim 3 wherein each module comprises:
a write request/acknowledge process cell configured to transfer the respective piece of data from the respective peripheral clock signal to the clock signal; and
a read request/acknowledge process cell configured to transfer the contents of the memory register to said read register, the read register operating at the clock signal.

5. The system as in claim 3 wherein said multiplexer is configured to sequentially receive data from said write slave register, according to both the arbitration cell and a timing of said logic unit.

6. The system as in claim 5 wherein said arbitration cell is configured to transfer the respective piece of data from the respective peripheral to said memory register.

7. A method of operating system comprising a plurality of peripherals, each peripheral having a respective peripheral clock signal, and a controller, the method comprising:
operating a memory register in the controller and to be shared by the plurality of peripherals;
operating a logic unit in the controller and coupled to the memory register, said logic unit to operate based upon a clock signal to write/read data in the memory register;
operating a bank of modules in the controller, and coupled to the logic unit and respectively coupled to the plurality of peripherals, the bank of modules to
write/read the data in the memory register, and
have priority value ranges between first and second priority values, the second priority value being greater than the first priority value, and operating a multiplexer in the controller and between the bank of modules, and the memory register;
each module of the bank of modules comprising an arbitration cell to
set a first module of the bank of modules to the first priority value, and
set the other modules of the bank of modules to lesser priority values; and operating the logic unit to write/read the data in the memory register when two or more of the plurality of peripherals need to write/read the data to/from the memory register at the same time using the set priority values of the bank of modules, the arbitration cells from the bank of modules being coupled in a modular chain of arbitration cells.

8. The method as in claim 7 wherein the clock signal operates at a frequency equal to a frequency of a clock signal external to the controller; and wherein the bank of modules operates based upon the clock signal.

9. The method as in claim 8 further comprising:
operating a write input interface, in each module, to receive, from each of the plurality of peripherals, the respective peripheral clock signal and a respective piece of data;
operating a write slave register, in each module, to store the respective piece of data before storing the respective piece of data in the memory register;
operating a read register, in each module, to display contents of the memory register; and
operating a read output interface, in each module, to read the contents of the memory register, the arbitration cell being in daisy chain arrangement, and determining when the respective piece of data in the write slave register has to be stored in the memory register.

10. The method as in claim 9 further comprising:
operating a write request/acknowledge process cell, in each module, to transfer the respective piece of data from the respective peripheral clock signal to the clock signal; and
operating a read request/acknowledge process cell, in each module, to transfer the contents of the memory register to the read register, the read register operating at the clock signal.

11. The method as in claim 9 wherein the multiplexer sequentially receives data from the write slave register, according to both the arbitration cell and a timing of the logic unit.

12. The method as in claim 11 wherein the arbitration cell transfers the respective piece of data from the respective peripheral to the memory register.

* * * * *